US012263644B2

(12) United States Patent
Podgursky et al.

(10) Patent No.: US 12,263,644 B2
(45) Date of Patent: Apr. 1, 2025

(54) THREE DIMENSIONAL PRINTER PROCESSING IMAGE INFORMATION TO PROVIDE OPTIMIZED MECHANICAL CONTROL SIGNALS

(71) Applicant: 3D Systems, Inc., Rock Hill, SC (US)

(72) Inventors: Nickalaus Podgursky, Huntersville, NC (US); Martin Alan Johnson, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 796 days.

(21) Appl. No.: 15/935,563

(22) Filed: Mar. 26, 2018

(65) Prior Publication Data

US 2018/0281292 A1 Oct. 4, 2018

Related U.S. Application Data

(60) Provisional application No. 62/477,771, filed on Mar. 28, 2017.

(51) Int. Cl.
*B29C 64/393* (2017.01)
*B29C 64/135* (2017.01)
*B29C 64/227* (2017.01)
*B29C 64/245* (2017.01)
*B29C 64/255* (2017.01)
(Continued)

(52) U.S. Cl.
CPC .......... *B29C 64/393* (2017.08); *B29C 64/135* (2017.08); *B29C 64/227* (2017.08); *B29C 64/245* (2017.08); *B29C 64/255* (2017.08); *B29C 64/264* (2017.08); *B29C 64/268* (2017.08); *B33Y 30/00* (2014.12);
(Continued)

(58) Field of Classification Search
USPC ................................. 700/118–120
See application file for complete search history.

(56) References Cited

U.S. PATENT DOCUMENTS 9,446,557 B2  9/2016 Zenere et al.
10,150,257 B1  12/2018 Joyce
(Continued)

FOREIGN PATENT DOCUMENTS

CN  20592587  9/2016
JP  2004-220081  8/2004
(Continued)

OTHER PUBLICATIONS

PCT International Search Report the International Searching Authority for PCT/US2018/024298, mailed Jul. 6, 2018 (5 pages).
(Continued)

*Primary Examiner* — Farah Taufiq

(57) ABSTRACT

A three dimensional printing system includes a controller that is configured to (1) receive an incoming slice data array that defines an initial two dimensional object having an initial outer boundary; (2) process the incoming slice data array to define a simple outer boundary whereby if the object has two portions defining a channel therebetween, the channel is reduced or eliminated thereby reducing a perimeter of the outer boundary. In one embodiment the object is two objects. If the channel is defined between the two objects, then the processing merges the two objects. If the channel is a concave recess within one object, then the processing reduces the depth of or eliminates the concave recess.

17 Claims, 11 Drawing Sheets

(51) Int. Cl.
    *B29C 64/264* (2017.01)
    *B29C 64/268* (2017.01)
    *B33Y 30/00* (2015.01)
    *B33Y 50/02* (2015.01)
    *B29K 105/00* (2006.01)
    *B29K 105/24* (2006.01)

(52) U.S. Cl.
    CPC ...... *B33Y 50/02* (2014.12); *B29K 2105/0058* (2013.01); *B29K 2105/24* (2013.01)

(56) References Cited

U.S. PATENT DOCUMENTS

| | | | |
|---|---|---|---|
| 10,384,374 | B2 | 8/2019 | Michael |
| 2004/0138861 | A1 | 7/2004 | Onedera et al. |
| 2015/0039113 | A1* | 2/2015 | Kanada ............... B29C 64/386 700/98 |
| 2015/0352791 | A1 | 12/2015 | Chen et al. |
| 2017/0102679 | A1* | 4/2017 | Greene ............... G06T 15/00 |
| 2018/0361679 | A1* | 12/2018 | Joyce ............... B29C 64/129 |
| 2019/0366596 | A1 | 12/2019 | Joyce |

FOREIGN PATENT DOCUMENTS

| | | |
|---|---|---|
| JP | 2014-501648 | 1/2014 |
| JP | 2019518638 | 7/2019 |
| WO | 2016123499 | 8/2016 |
| WO | 2016149104 | 9/2016 |

OTHER PUBLICATIONS

PCT Written Opinion of the International Searching Authority for PCT/US2018/024298, mailed Jul. 6, 2018 (6 pages).

English Translation of First Office Action for Japanese Application No. 2019-548704 mailed Dec. 22, 2020 (2 pages).

English Translation of First Examination Report for India Application No. 201917037774, mailed Dec. 19, 2020 (6 pages).

* cited by examiner

THREE DIMENSIONAL PRINTER PROCESSING IMAGE INFORMATION TO PROVIDE OPTIMIZED MECHANICAL CONTROL SIGNALS This non-provisional patent application claims priority to U.S. Provisional Application Ser. No. 62/477,771, Entitled "Three Dimensional Printer Processing Image Information to Provide Optimized Mechanical Control Signals" by Martin Alan Johnson et al., filed on Mar. 28, 2017, incorporated herein by reference under the benefit of U.S.C. 119(e).

FIELD OF THE INVENTION

The present disclosure concerns an apparatus and method for fabrication of solid three dimensional (3D) articles of manufacture from energy curable materials. More particularly, the present disclosure concerns a way of optimizing the speed and output quality of a three dimensional (3D) printer that utilizes photocurable resins.

BACKGROUND

Three dimensional (3D) printers are in rapidly increasing use. One class of 3D printers includes stereolithography printers having a general principle of operation including the selective curing and hardening of radiation curable (photocurable) liquid resins. A stereolithography system forms a three dimensional (3D) article of manufacture by selectively curing layers of the photocurable resin. A typical stereolithography system includes a containment vessel holding the photocurable resin, one or more movement mechanism (s), and a controllable light engine. One movement mechanism is used for positioning the three dimensional (3D) article of manufacture before each layer of photocurable resin is selectively cured. In some embodiments another movement mechanism can be used for layering the photocurable resin.

One challenge with stereolithography systems is a variation in factors such as the viscosity of photocurable resins used and the varying geometries of the 3D articles being fabricated. These factors can impact the optimal motion control of the movement mechanism. There is a tradeoff between fabrication speed and quality that is impacted by the motion control. A need exists for improved motion control.

BRIEF DESCRIPTION OF THE FIGURES

FIG. 10D corresponds to step 98 of FIG. 10.

SUMMARY

Figure 1:
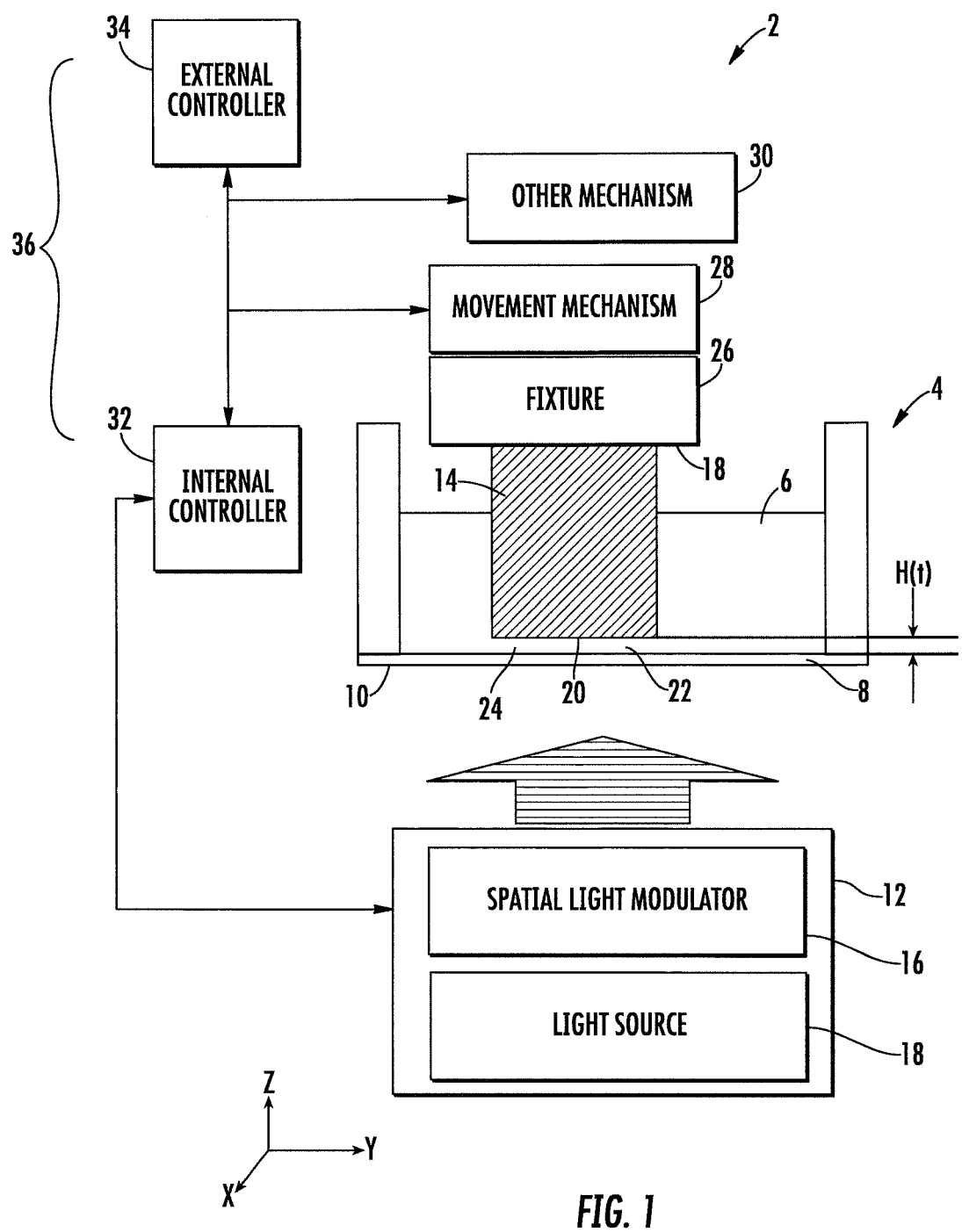
FIG. 1 is a schematic block diagram of an exemplary printing system.

In a first aspect of the disclosure, a three dimensional printing system includes a controller that is configured to (1) receive an incoming slice data array that defines an initial two dimensional object having an initial outer boundary; (2) process the incoming slice data array to define a simple outer boundary whereby if the object has two portions defining a channel therebetween, the channel is reduced or eliminated thereby reducing a perimeter of the outer boundary. In one embodiment the object is two objects. If the channel is defined between the two objects, then the processing merges the two objects. If the channel is a concave recess within one object, then the processing reduces the depth of or eliminates the concave recess.

In one implementation the processing includes dilating the initial object whereby portions of the initial outer boundary are dilated outwardly in a direction that is normal to the outer boundary at each point on the outer boundary. When there is a narrow channel, boundary portions defining the narrow channel overlap during the dilation. Object portions defining the narrow channel will therefore merge during the dilation. The result is a dilated object. In one embodiment the dilated object has 1.5 to 2.0 times the area of the initial object. After dilation, the dilated object is shrunk or scaled to the area of the initial object. Portions of the object that have merged do not unmerge—and thus, the result is a dilated and scaled object for which any narrow channels are reduced in depth or eliminated. In one embodiment the dilated and scaled object is combined with the initial object to provide a union of the initial object and the dilated and scaled object.

In another implementation the object with the simple outer boundary (simplified object) is processed to determine an inflow distance D. In one embodiment this is determined by a stepwise inward erosion of the object with each step moving normal to the simple outer boundary at each point on the simple outer boundary. A number of steps required to completely erode the simplified object times the step size equals the inflow distance D. The inflow distance D is utilized to compute at least one mechanical operational parameter for the three dimensional printing system.

In yet another implementation the controller includes a processor and an information storage device. The information storage device includes a non-volatile or non-transient storage device storing instructions that, when executed by the processor, control the light engine and the movement mechanism. The controller can be at one location or distributed among a plurality of locations in the printing system. In one embodiment the controller includes an external controller that is external to a print engine and an internal controller that is internal to a print engine. The controller is configured to control various portions of the three dimensional printing system.

In a second aspect of the disclosure, a three dimensional printing system includes a vessel, a light engine, a movement mechanism, and a controller. The vessel is for containing a photocurable resin. The movement mechanism is for mechanically gripping and/or translating a component of the three dimensional printing system. The controller is configured to (1) receive an incoming slice data array defining an initial two dimensional object having an initial outer boundary, (2) process the incoming slice data array along an imaging data path and, (3) process the incoming slice data array along a mechanism control data path. Processing the incoming slice data array along the imaging data path includes (a) converting the incoming slice data array to control signals that are compatible with the light engine and (b) sending the control signals to the light engine. Processing the incoming slice data array along the mechanism control data path includes (a) reducing a perimeter length contributed by any channels defined between portions of the initial outer boundary to provide a simple outer boundary, (b) computing an inflow distance (D) for the simple outer boundary, and (c) process the control signals to determine control signals for the movement mechanism, the control signals determine one or more of a translation distance, a translation speed, a gripping force, and a delay time.

In one implementation the vessel includes a lower portion having a transparent sheet. The three dimensional printing system includes a fixture for supporting a three dimensional article of manufacture whereby a lower face of the three dimensional article of manufacture is in facing relation with the transparent sheet. The light engine is configured to transmit pixelated light up through the transparent sheet to harden photocurable resin on and proximate to a build plane in response to receiving the control signals along the imaging data path. The hardened photocurable resin is incrementally layered onto the lower face. The light engine includes a light source and a spatial light modulator.

DETAILED DESCRIPTION OF THE PREFERRED EMBODIMENTS

FIG. 1 is a schematic block diagram depicting an exemplary printing system 2. In this and other figures, mutually perpendicular axes X, Y and Z will be used. Axes X and Y are lateral axes. In some embodiments X and Y are also horizontal axes. Axis Z is a central axis. In some embodiments Z is a vertical axis. In some embodiments the direction +Z is generally upward and the direction −Z is generally downward.

Print engine 2 includes a vessel 4 containing photocurable resin 6. Vessel 4 includes a transparent sheet 8 forming at least a portion of a lower portion 10 of vessel 4. A light engine 12 is disposed and configured to selectively project light up through the transparent sheet 8 to selectively cure the photocurable resin 6 during formation of a three dimensional article of manufacture 14. In one embodiment, light engine 12 can include a light source 18 and a spatial light modulator 16.

Between a lower face 20 of the three dimensional article of manufacture 14 and the transparent sheet 8 is a thin layer 22 of photocurable resin 6. As the light engine 12 operates, a portion of the thin layer 22 of photocurable resin 6 is cured and solidified at and proximate to a build plane 24. Build plane 24 defines a lateral extent (along X and Y) of a layer of photocurable resin that the light engine 12 is capable of curing when forming the three dimensional article of manufacture 14.

Print engine 2 includes a fixture 26 for supporting the three dimensional article of manufacture 14. Fixture 26 is coupled to a movement mechanism 28 that controllably positions fixture 26 along the vertical Z-axis. Movement mechanism 28 thereby controls a distance H(t) between the lower face 20 of the three dimensional article of manufacture 14 and the transparent sheet 8.

Printing system 2 includes one or more other mechanisms 30. In one embodiment, mechanism 30 can be robotic gripper for removing and replacing the fixture 26 from the movement mechanism 28. Such a robotic gripper 30 can move in X, Y, and Z.

Print engine 2 also includes an internal controller 32 under control of an external controller 34. Internal 32 and external 34 controllers can collectively be referred to as a "controller 36" that controls the operation of light engine 12, movement mechanism 28, other mechanisms 30, and other portions of printing system 2.

During operation of printing system 2, the movement mechanism 28 raises and lowers the three dimensional article of manufacture 14 within the photocurable resin 6. Between the lower face 20 and the transparent sheet 8 the thin layer 22 of resin becomes depleted as the light engine 12 operates and cures the photocurable resin 6 at build plane 24. This is particularly problematic when the lower face 20 has certain large geometries. To maintain the photocurable resin 6 at the build plane 24, the movement mechanism may need to raise and lower the lower face 20. There is an optimal speed and height of movement associated therewith. The controller 36 is configured to analyze the geometry of the lower face 20 to determine optimal motion induced by the movement mechanism 28. This will be described further with respect to the following figures.

While FIG. 1 depicts a particular printing system 2, other embodiments are possible. An alternative printing system 2 may includes a light engine 12 disposed above vessel 4 for a downward illumination of the photocurable resin 6. The fixture would then be positioned below the three dimensional article of manufacture 14. The light engine 12 may include a laser and scanning optics. The other mechanisms 30 may include a device for facilitating the dispensing or layering of photocurable resin 6 onto the three dimensional article of manufacture 14.

Figure 2:
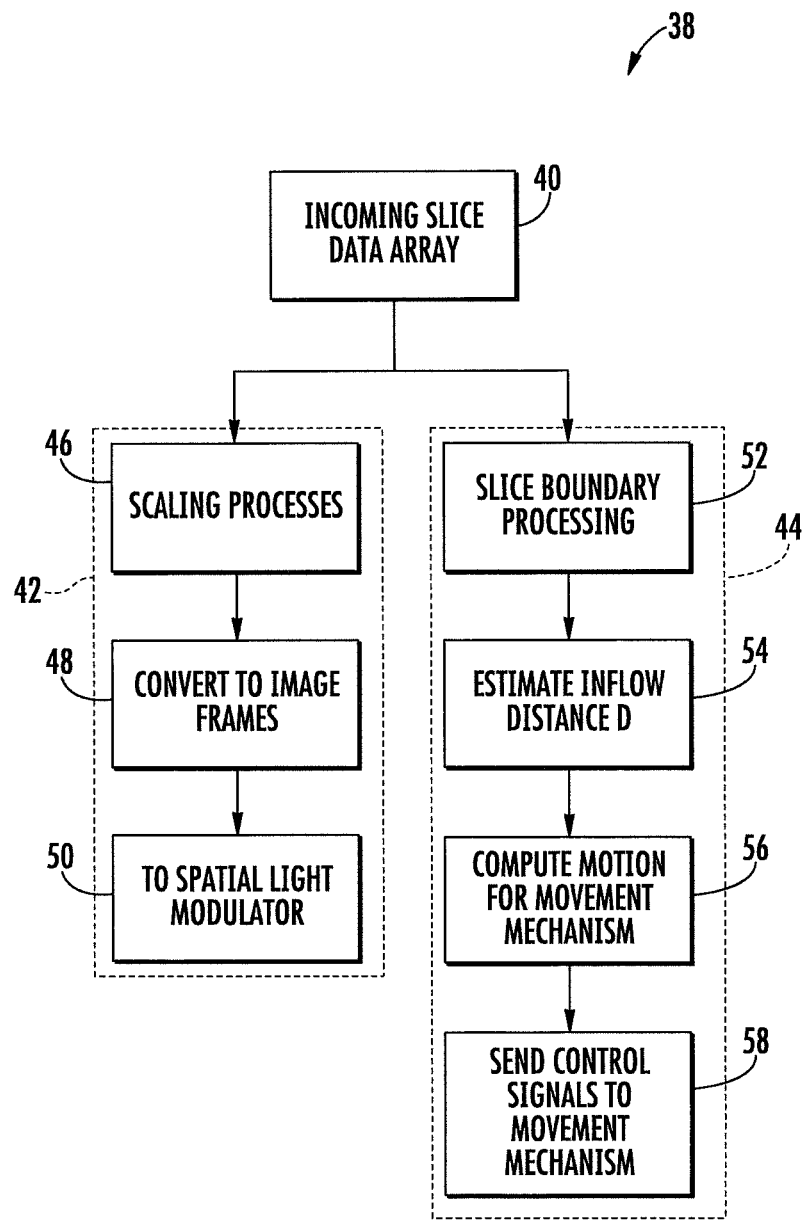
FIG. 2 is a data flow block diagram depicting a bifurcated data path or two data paths for processing an incoming slice data array.

FIG. 2 is an "information flow" block diagram that illustrates an exemplary bifurcated data path 38 (defining two data paths) defined by the controller 36. Data path 38 can be utilized when a new layer of photocurable resin 6 is formed onto the lower face 20 of the three dimensional article of manufacture 14.

An incoming slice data array 40 is generated and/or received by controller 36. Incoming slice data array 40 defines energy values for an array of pixel elements that collectively define the build plane 24. A non-zero energy value would determine a level of curing for a given pixel element which would define part of a two dimensional object to be cured at the build plane 24. Data path 38 is bifurcated including an imaging data path 42 and a mechanism control data path 44.

Along imaging data path 42 the incoming slice data array 40 is processed before being sent to the spatial light modulator 16. According to process 46, the incoming data array 40 is processed to provide the proper resolution and scaling for the spatial light modulator 16. Another scaling process 46 can include corrections for various distortions such as barrel distortion and keystone effect. Yet another scaling process 46 can include applying a transparency mask for light engines having multiple spatial light modulators. The output from scaling process 46 is a scaled slice data array.

According to process 48, the scaled slice data array is converted into image frames that are directly compatible with the spatial light modulator 16. According to 50, the image frames are sent to spatial light modulator 16 which spatially modulates the light to provide selectively pixelated illumination of the build plane 24. One important point about the imaging data path 42 is that boundaries of the two dimensional object represented by the incoming slice data array 40 are not changed. That is one way in which the mechanism control data path 44 differs from the imaging data path 42.

Along mechanism control data path 44 the incoming slice data array 40 is utilized to generate control signals for the movement mechanism 28. The incoming slice data array 40 defines one or more boundaries that enclose one or more two dimensional objects. In some situations the one or more boundaries define channels between two outer boundaries or concave recesses along an outer boundary. According to 52, the incoming slice data array 40 is processed to reduce or eliminate any channels or concave recesses and thereby reduce a total perimeter of the one or more boundaries when such features exist. This facilitates data process 54 at which an inflow distance D is computed. At data process 56, the inflow distance is utilized to compute a motion parameter for the movement mechanism 28. At process 58, control signals are sent to the movement mechanism 28 that are consistent with the computed motion parameter from process 56. A key point is this—the slice boundary produced by process 52 is geometrically different than that defined by incoming slice data array 40. That is a reason why the two data paths 42 and 44 are utilized.

Figure 3:
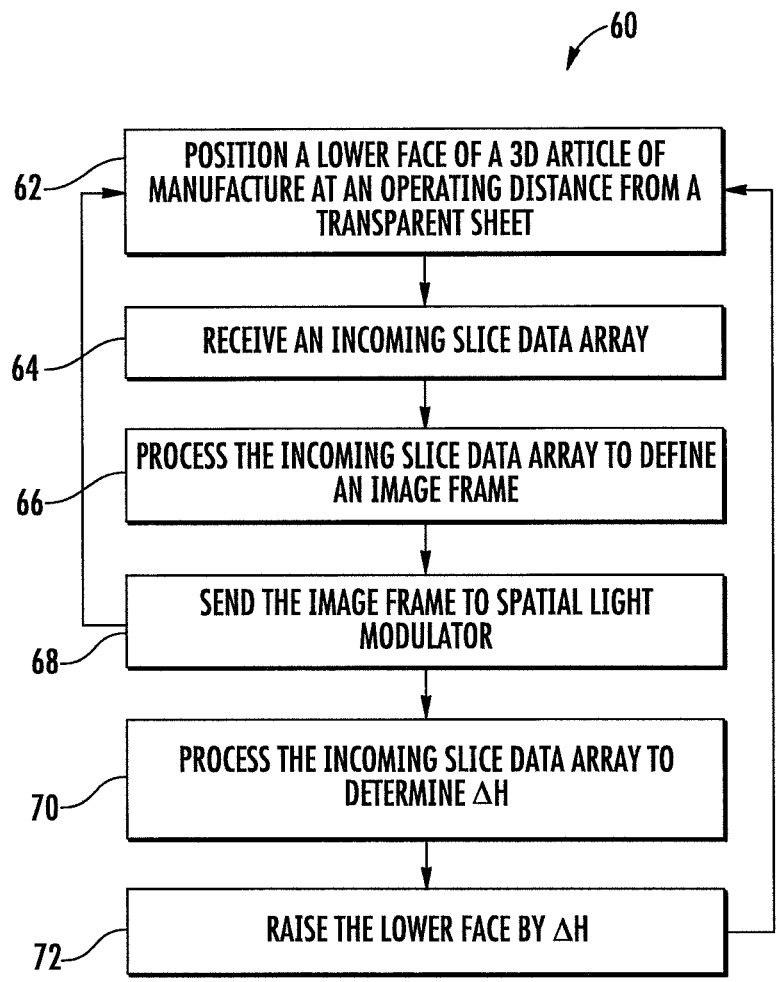
FIG. 3 is a flowchart depicting an exemplary method of operating a three dimensional printing system.

FIG. 3 is flowchart depicting an exemplary method 60 by which the layers of material are added onto a three dimensional article of manufacture 14. According to step 62, the movement mechanism 28 positions the lower face 20 at or proximate to build plane 24. According to step 64 an incoming slice data array 40 is received or generated by controller 36. According to step 66 the controller 36 processes the incoming slice data array 40 to define one or more image frames. Step 66 of method 60 corresponds to processes 46 and 48 of FIG. 2. According to step 68, the one or more image frames are sent to spatial light modulator 16. As part of step 68, the light source 18 is either on continuously or is turned on and off. Step 68 results in a solidified layer of polymer added to the lower face 20 of the three dimensional article of manufacture 14. Steps 62-68 are repeated until there is a need to replenish the thin layer 22 of resin 6.

According to step 70 the incoming slice data array is processed to determine a pump distance ΔH. Step 70 of method 60 corresponds to processes 52 to 56 of FIG. 2.

According to step 72, the lower face 20 is raised by ΔH which replenishes the thin layer 22 of resin 6. Then the process proceeds back to step 62.

Steps 62 to 72 are repeated until the three dimensional article of manufacture 14 is fully formed. Variations are possible. For example, step 70 can occur concurrently with or prior to steps 62 to 68. In some embodiments, the ΔH values are all determined before the method 60 is performed and are simply read out of memory in step 70.

Figure 4:
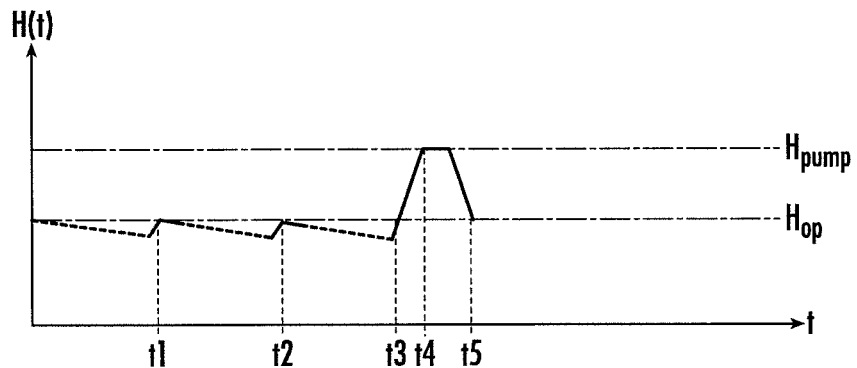
FIG. 4 is an exemplary timing diagram corresponding to the flowchart of FIG. 3.

FIG. 4 is an exemplary timing diagram corresponding to method 60 of FIG. 3. This timing diagram is a plot of H(t) versus time t in which H(t) is a height of the lower face 20 above the transparent sheet 8. The time period from 0 to t1 corresponds to steps 62-68. The time period from t1 to t2 corresponds to looping from step 68 back to step 62 and then steps 62-68. The time period t2 to t3 also corresponds to looping from step 68 back to step 62 and then steps 62-68. The time period t3 to t4 corresponds to step 72 in which $H_{pump}-H_{op}$ equals ΔH. The time period from t4 to t5 corresponds to looping from step 72 to step 62.

Figure 5:
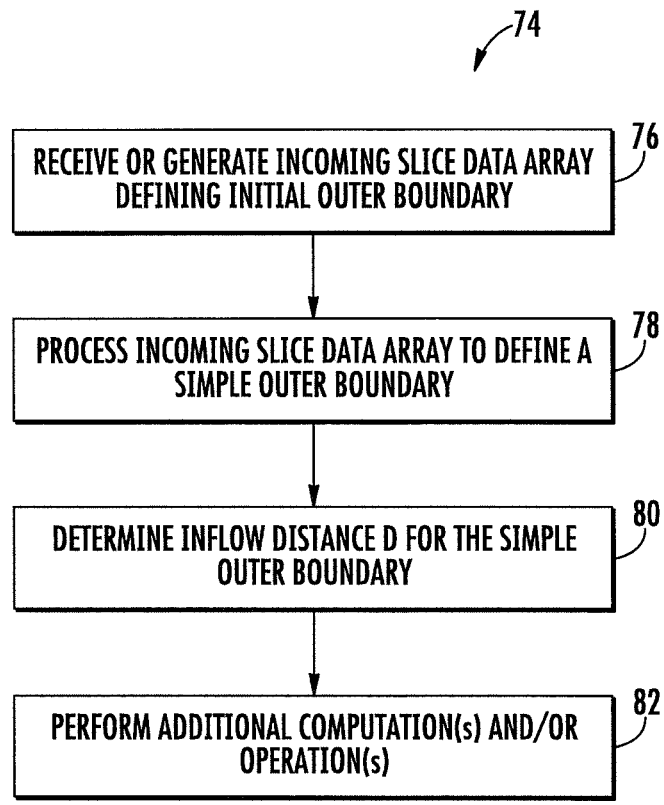
FIG. 5 is a flowchart depicting a method for defining at least one mechanical parameter based at least partly upon an incoming slice data array.

FIG. 5 is flowchart depicting a general method 74 for performing a mechanism related computation based upon receiving and processing the incoming slice data array 40. FIGS. 6-9 will be used to help explain method 74. Method 74 corresponds to the data path 44 of FIG. 2. According to step 76, the controller 36 receives or generates an incoming slice data array 40 that defines an initial outer boundary of a two dimensional object.

Figure 6:
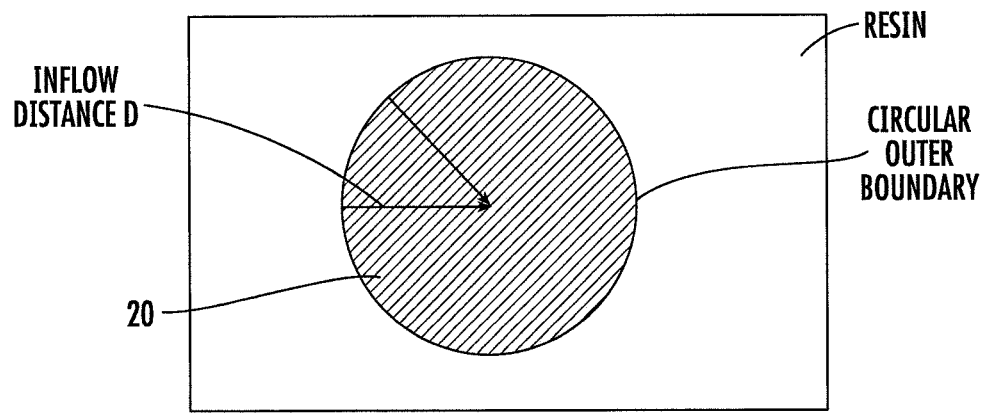
FIG. 6 is a top (plan) view illustrating an inflow distance for a solid circular object having a simple outer boundary.
Figure 7:
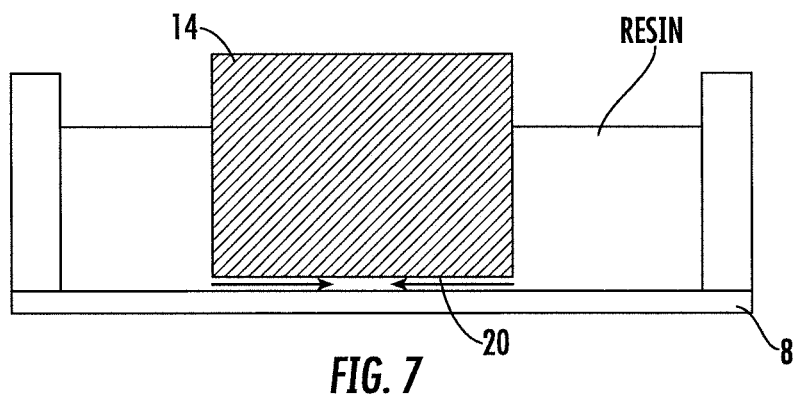
FIG. 7 is a side cross sectional view illustrating the radial inflow of resin between a transparent sheet and the lower face of a right circular cylinder as the lower face is being raised.

As may be appreciated, a wide variety of two dimensional objects may be received. An example of a very simple outer boundary is a solid circle as depicted in FIG. 6. When a lower face 20 has such a geometry is raised from the transparent sheet 8, we can model an "inflow distance D" that is the radius of the circle. The inflow of resin is depicted in FIG. 7. The inflow distance D is a measure of the distance resin has to flow from the outer boundary to completely cover the lower face 20. Because the inflow distance for a solid circle is so easy to compute this is referred to as a "simple outer boundary."

Figure 8:
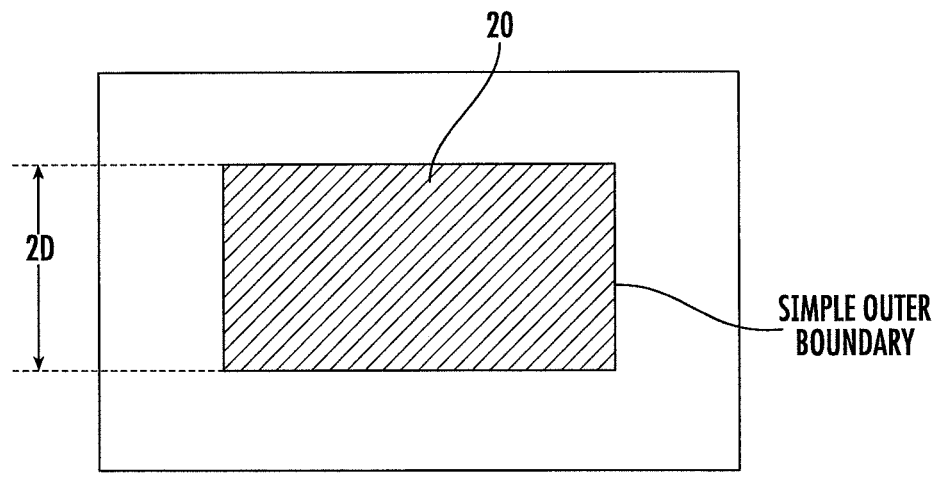
FIG. 8 is a top (plan) view illustrating a solid rectangular object having a simple outer boundary.

Another example of a simple outer boundary is that of a right rectangle as depicted in FIG. 8. The inflow distance D for this shape equals half of the length of the shorter side of the rectangle. When resin has flowed that far, it has covered the lower face 20.

Figure 9:
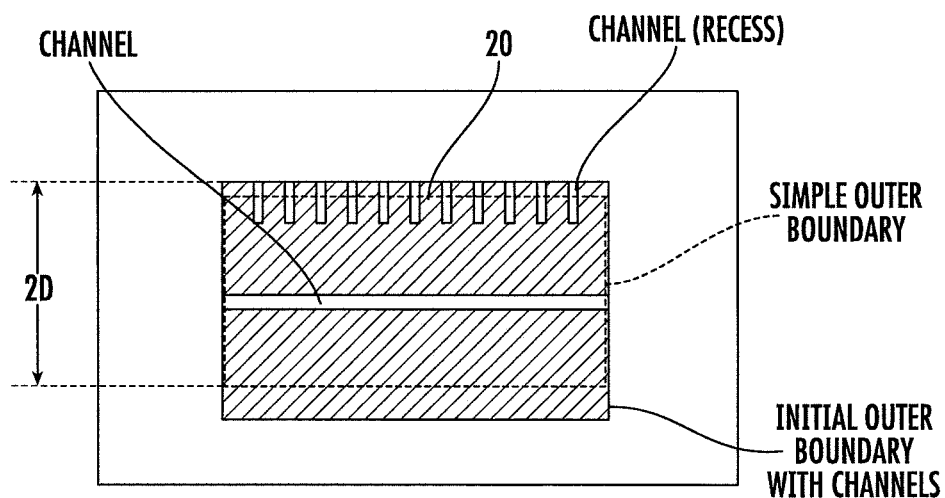
FIG. 9 is a top (plan) view illustrating a rectangular object having channels that separate portions of the initial outer boundary.

FIG. 9 depicts a geometry that is more complicated. The initial outer boundary has an inner channel plus a plurality of recesses that result in a comb-shaped outer boundary. Defining the inflow distance D for this geometry is not so straight forward and is found using the method 74 of FIG. 5.

According to step 78, the outer incoming slice data array 40 is processed to define a simple outer boundary. For the solid circular geometry of FIG. 6 or the solid right rectangular geometry of FIG. 8, the processing of step 8 has essentially no change on the outer boundary since it is already "simple." However, for outer boundaries having channels between portions of the initial outer boundary, the outer boundary geometry is changed. The dashed rectangle in FIG. 9 indicates a "simple" outer boundary that may be equivalent to the more complicated initial outer boundary. The inflow distance D equals half the length of the shorter side of the illustrated dashed rectangle for FIG. 9.

According to step 80, an inflow distance D is computed for the simpler outer boundary. Finally according to step 82, additional computations are performed based upon the computed value of D. The additional computations can be the determination of one or more of a translation distance, a translation speed, a gripping force, a delay time, or other mechanical parameters. In one embodiment, a pump distance ΔH and speed are determined for the system of FIG. 1.

Figure 10:
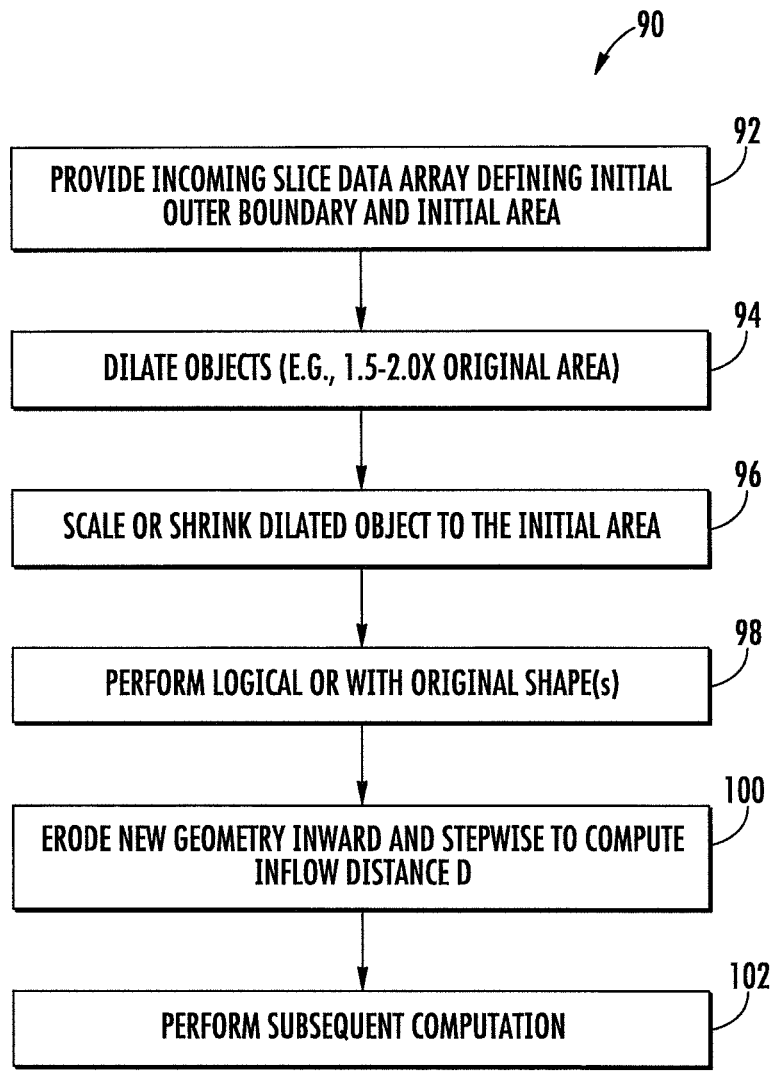
FIG. 10 is flowchart depicting an exemplary embodiment for processing an incoming slice data array to determine an inflow distance D and a subsequent computation.
Figure 10A:
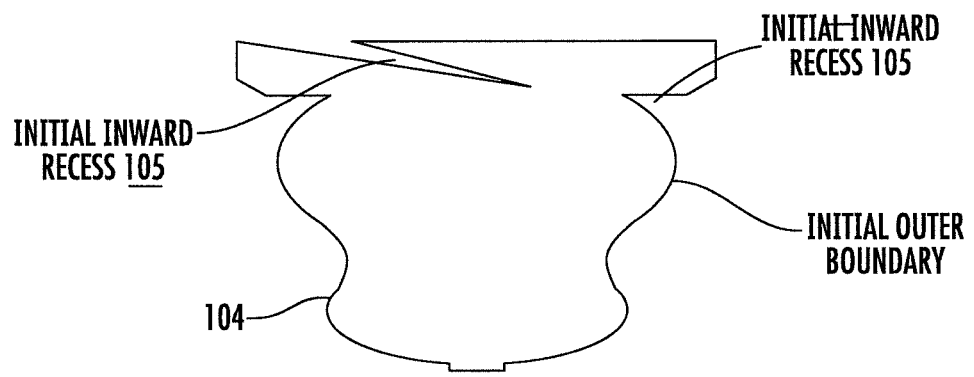
FIG. 10A is a schematic diagram of an initial object having an initial outer boundary defined by an incoming slice data array according to step 92 of FIG. 10.

FIG. 10 is a flowchart depicting a method 90 that is a particular embodiment of the method 74 of FIG. 5. The steps of this method are depicted in FIGS. 10A-10E. According to step 92, the controller 36 receives or generates an incoming slice data array defining an initial outer boundary of an initial two dimensional object. The initial two dimensional object has an initial area. An exemplary initial outer boundary 104 is depicted in FIG. 10A. Note that the initial outer boundary includes a number of inward concave recesses or channels 105 that make determination of the inflow distance D difficult.

Figure 10B:
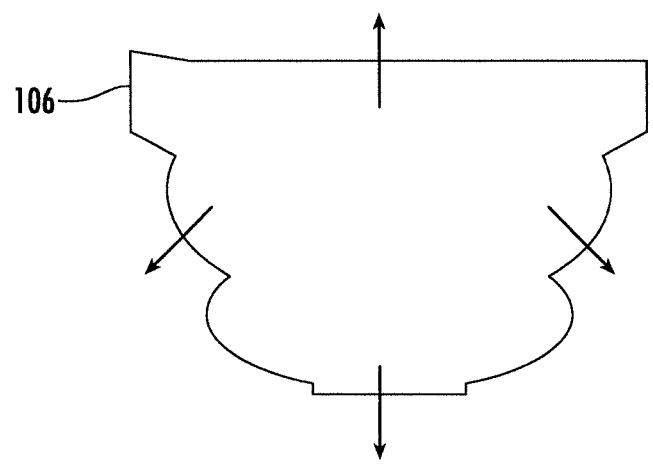
FIG. 10B is a schematic diagram of a dilated outer boundary according to step 94 of FIG. 10.

According to step 94, all portions of the initial outer boundary are dilated outwardly until the total area of the object is increased to 1.5 to 2.0 times the initial area. The dilation is done normal to all outer boundary portions. The effect is to merge portions of the object that have narrow channels (such as inward recesses) therebetween. This is because the boundary portions defining a narrow channel will grow toward and merge into each other. FIG. 10B depicts a dilated outer boundary 106. The result is that the depth of the initial inward recesses or channels have been reduced.

Figure 10C:
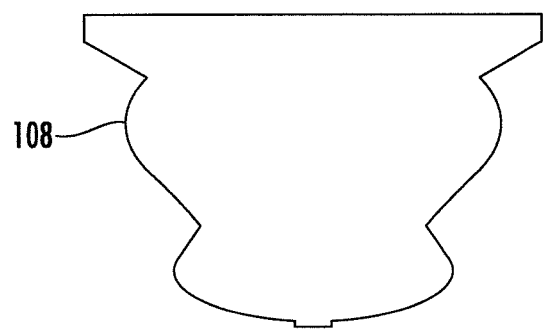
FIG. 10C is a schematic diagram of a dilated and shrunk outer boundary according to step 96 of FIG. 10.

According to step 96, the object is scaled or shrunk down to its initial area. The dilated and scaled outer boundary 108 is illustrated in FIG. 10C. While the shape in FIG. 10C has the same area as that of FIG. 10A, the initial recesses are reduced in depth and the overall perimeter of the object is reduced relative to FIG. 10A. The scaling process of step 96 includes a shrinking back of the outer boundary 106 that results in the "simple outer boundary" 108.

Figure 10D:
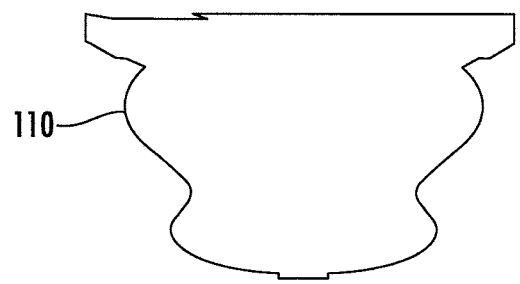
FIG. 10D is a schematic diagram of a simple outer boundary that is a result of a union between the object of the initial object and the dilated and scaled outer boundary of FIG. 10C.

According to step 98, a union is formed between the original object and the dilated and shrunk object from step 96. From a pixel to pixel standpoint, this is a logical OR combination. This is illustrated in FIG. 10D which depicts the a "simple outer boundary" 110 that facilitates the determination of the inflow distance D. One way to visualize the inflow distance D—it is the minimum distance of fluid flow travel from the boundary portions until the entire object is covered with fluid.

Figure 10E:
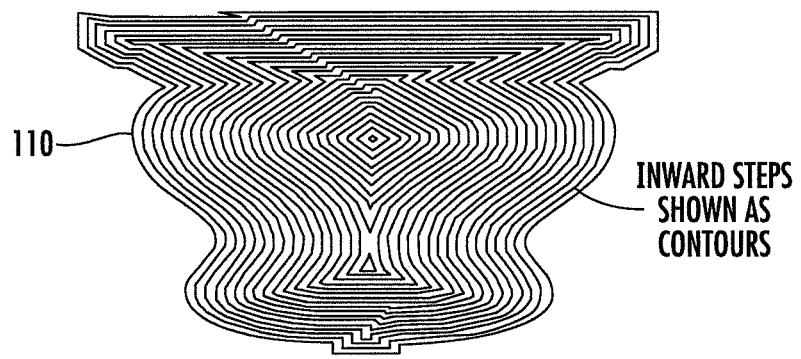
FIG. 10E is a schematic diagram illustrating an erosion of the simple outer boundary inwardly to determine an inflow distance D equal to a number of erosion steps times a step length.

According to step 100, the object from step 98 is eroded to determine the inflow distance. This involves stepping inwardly form all portions of the outer boundary by a certain step size until the object is covered with the steps. This is illustrated in FIG. 10E. The number of steps times a step length equals a computed inflow distance D. According to step 102, the inflow distance D is used to perform a subsequent computation for controlling a mechanical mechanism such as the movement mechanism 28.

As an alternative to method 90, step 98 is not included. Thus, step 100 immediately follows step 96.

Figure 11:
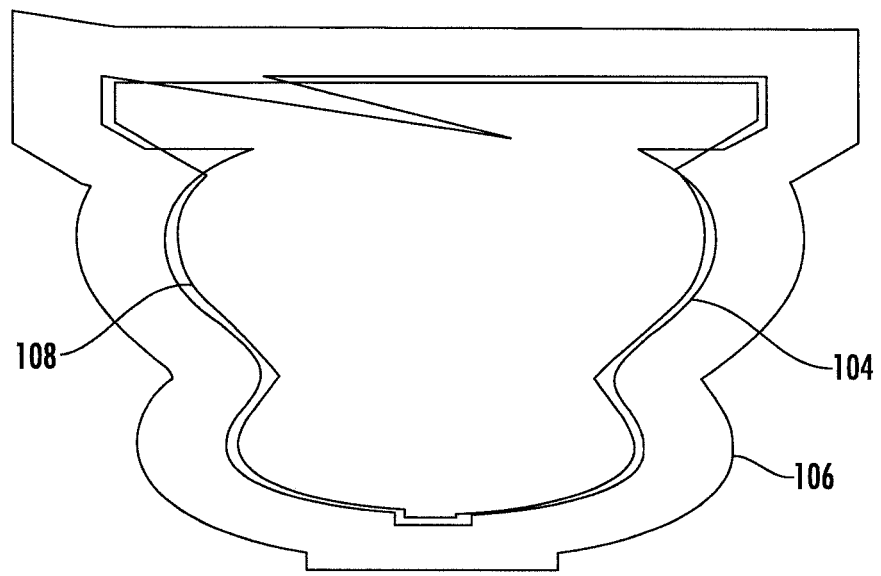
FIG. 11 is a schematic diagram illustrating an overlay of the outer boundaries from FIGS. 10A, 10B, and 10C.

FIG. 11 depicts an overlay of initial 104, dilated 106, and dilated and shrunk 108 outer boundaries obtained from process steps 92, 94, and 96 respectively. The overlay of the initial 104 and dilated and scaled 108 outer boundaries is used for step 100 to determine inflow distance D.

Figure 12:
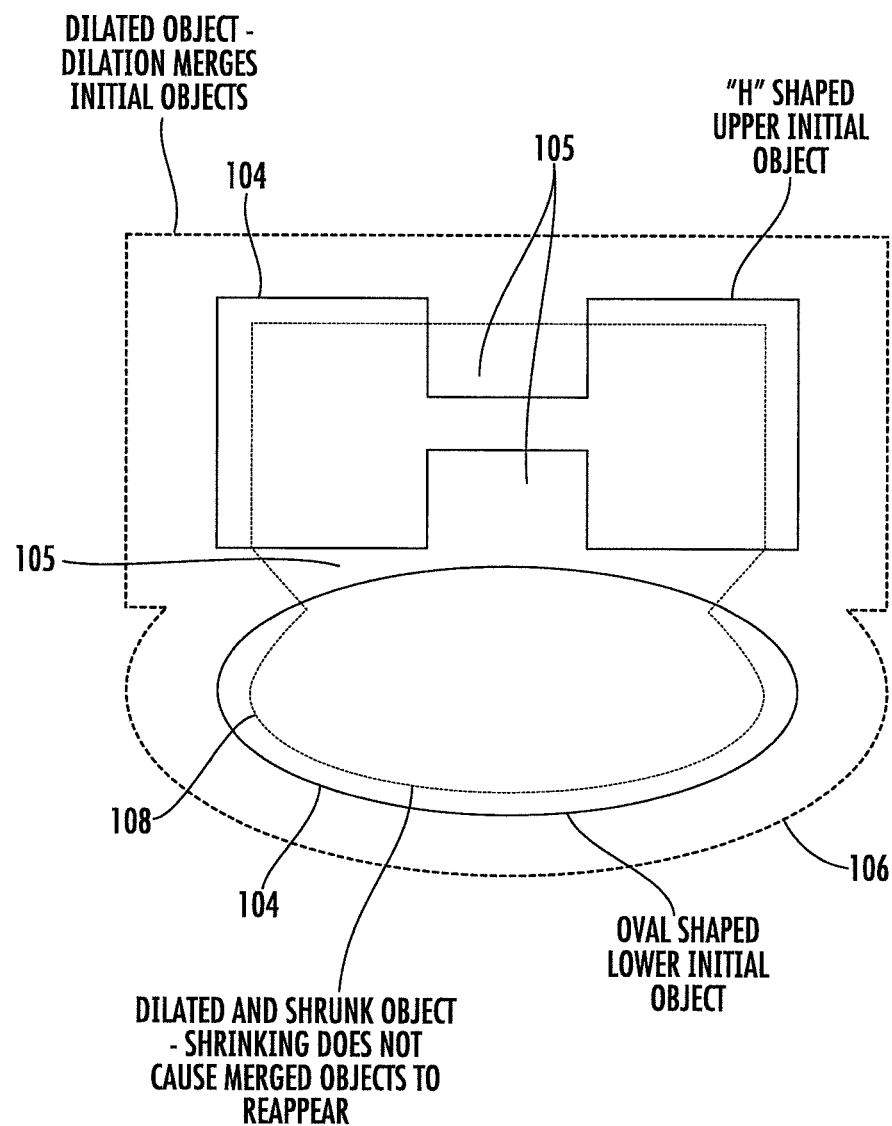
FIG. 12 is a schematic diagram illustrating the effect of a process on an object that includes two objects including an "H" shaped object (top) and an oval object (bottom).

FIG. 12 depicts the methods of dilating and scaling for an initial object that is actually two initial objects 104. The two initial objects 104 include an upper object shaped like an "H" 104 and a lower oval shape 104. When considering the two objects, there are several channels 105 between portions of the outer boundary 104. The H shaped object has two inward recesses 105 as shown. Also, the proximity between the H and the oval defines a channel 105. In FIG. 12, the initial 104 outer boundaries are represented as solid lines 104.

The dilation process of method step 94 results in a dilated outer boundary 106 in which all of the channels 105 are nearly gone. This also has the effect of merging the H and oval shapes. In FIG. 12, the dilated outer boundary 106 is represented as a dashed line 106.

The shrinking of method step 96 results in the dilated and shrunk outer boundary 108. The method step 98 combines the shapes with outer boundaries 104 and 108. In some embodiments, method step 98 is not included. In FIG. 12, the dilated and shrunk outer boundary 108 is represented as a dotted line 108.

As a note—had the oval shape been the only initial object then the processes of steps 94-98 would have had little or no effect the outer boundary 104 because dilation would not cause any outer boundary portions to overlap and no portions of objects would be merged. Thus, as illustrated, there are two basic cases:

(A) The initial outer boundary 104 is a "simple outer boundary" such as a square, circle, oval, rectangle, etc. For this case, processing the incoming slice data array would leave the initial outer boundary essentially unchanged. This is because the dilation process of step 94 does not cause any portions of outer boundaries to overlap and thereby merge object portions.

(B) The initial outer boundary includes a narrow channel between two objects (or portions of the same object) that will be closed by the dilation process. For this case, processing the incoming slice data array will result in a partial or complete elimination of the narrow channel and a merger between the two objects (or portions). This is because the dilation process causes portions of the outer boundary to overlap and thus for the objects or portions of objects to merge. When the outer boundary is shrunk such that the area of the object is reduced to the original area, the merged portions do not unmerge and the overall perimeter of the outer boundary is reduced as a result of steps 94 and 96.

There are two cases of narrow channels 105. A first case is a narrow channel 105 separating two objects such as the FIG. 12 illustration of the H and oval shapes. The second case is a recessed concave portion of the outer boundary such as the two recesses of the H (FIG. 12) or the initial recesses illustrated in FIG. 10A.

The specific embodiments and applications thereof described above are for illustrative purposes only and do not preclude modifications and variations encompassed by the scope of the following claims.

What we claim is:

1. A three dimensional printing system for manufacturing a three dimensional article of manufacture comprising:
   a vessel containing for containing photocurable resin;
   a light engine;
   a movement mechanism for mechanically translating a component of the three dimensional printing system;
   a controller configured to:
      receive an incoming slice data array defining a two dimensional object having an initial outer boundary;
      process the incoming slice data array along an imaging data path further including:
         converting the incoming slice data array to control signals for the light engine; and
         sending the control signals to the light engine thereby selectively hardening the polymerized layer geometry; and process the incoming slice data array along a mechanism control data path further including:
  process the incoming slice data array to simplify an outer boundary for the object to provide a simplified outer boundary, simplifying an outer boundary defined by a reduction of a perimeter length defined by any channels between portions of the initial outer boundary;
  compute an inflow distance (D) for the simplified outer boundary;
  process the inflow distance (D) to determine control signals for the movement mechanism, the control signals determine one or more of a translation distance, a translation speed, gripping force, and a delay time;
the controller operates the movement mechanism in the manufacture of the three dimensional article to translate the component according to the determined control signals including one or more of the translation distance, the translation speed, the gripping force, and the delay time.

2. The three dimensional printing system of claim 1 wherein the vessel includes a lower portion including a transparent sheet, the light engine is configured to selectively transmit pixelated light up through the transparent sheet.

3. The three dimensional printing system of claim 2 wherein the light engine includes a light source and a spatial light modulator.

4. The three dimensional printing system of claim 2 further comprising a fixture for supporting the three dimensional article of manufacture, the three dimensional article of manufacture having a lower face in facing relation with the transparent film, the movement mechanism controls a distance between the lower face and the transparent sheet.

5. The three dimensional printing system of claim 4 wherein the control signals determined by the inflow distance further determine a pump distance that the lower face is raised above the transparent sheet to replenish the photocure resin therebetween, the translation distance is the pump distance.

6. The three dimensional printing system of claim 4 wherein the control signals determined by the inflow distance further determine a pump velocity at which the lower face is raised above the transparent sheet, the translation speed is the pump velocity.

7. The three dimensional printing system of claim 1 wherein processing the incoming data array to provide a simplified outer boundary includes merging two portions of objects when they define a narrow channel between them.

8. The three dimensional printing system of claim 1 wherein processing the incoming data array to provide a simplified outer boundary includes reducing or eliminating a depth of a recess when the incoming boundary includes a concave portion defining a recess.

9. The three dimensional printing system of claim 1 wherein processing the incoming slice data array to provide a simplified outer boundary includes dilating the initial outer boundary.

10. The three dimensional printing system of claim 9 wherein processing the incoming slice data array to provide a simplified outer boundary further includes shrinking the outer boundary.

11. The three dimensional printing system of claim 1 wherein the inflow distance (D) is computed by eroding the simplified outer boundary in steps to determine the number of steps to fully erode the object.

12. A three dimensional printing system for manufacturing a three dimensional article of manufacture comprising:
  a vessel containing for containing photocurable resin;
  a light engine;
  a movement mechanism for mechanically translating a component of the three dimensional printing system;
  a controller configured to:
    receive an incoming slice data array defining a two dimensional object having an initial outer boundary;
    process the incoming slice data array along an imaging data path further including:
      converting the incoming slice data array to control signals for the light engine; and
      sending the control signals to the light engine thereby selectively hardening the polymerized layer geometry; and
    process the incoming slice data array along a second data path further including:
      process the incoming slice data array to simplify an outer boundary to provide a simplified outer boundary, if the object has two portions defining a channel therebetween, simplifying the outer boundary is defined as causing the channel to be reduced or eliminated thereby reducing a perimeter of the outer boundary;
      compute an inflow distance (D) for the simplified outer boundary;
      process the inflow distance (D) to determine control signals for the movement mechanism, the control signals determine one or more of a translation distance, a translation speed, gripping force, and a delay time;
  the controller operates the movement mechanism in the manufacture of the three dimensional article to translate the component according to the determined control signals including one or more of the translation distance, the translation speed, the gripping force, and the delay time.

13. The three dimensional printing system of claim 12 wherein if the two dimensional object includes two objects with a channel formed therebetween, the two objects are merged thereby reducing or eliminating the channel.

14. The three dimensional printing system of claim 12 wherein if the channel is a concave portion of the initial outer boundary, a depth of the concave portion is reduced.

15. The three dimensional printing system of claim 12 wherein processing the incoming slice data array to provide a simplified outer boundary includes dilating the initial outer boundary whereby any channels are at least partially filled in.

16. The three dimensional printing system of claim 15 wherein processing the incoming slice data array to provide a simplified outer boundary further includes shrinking the outer boundary.

17. The three dimensional printing system of claim 12 wherein the inflow distance (D) is computed by eroding the simplified outer boundary in steps to determine the number of steps to fully erode the object.

* * * * *